(12) United States Patent
Shen et al.

(10) Patent No.: US 11,731,369 B2
(45) Date of Patent: Aug. 22, 2023

(54) VIBRATION WELDING SYSTEMS AND METHODS

(71) Applicant: ROHR, INC., Chula Vista, CA (US)

(72) Inventors: Shyan Bob Shen, San Diego, CA (US); Michael Van Tooren, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/554,137

(22) Filed: Dec. 17, 2021

(65) Prior Publication Data
US 2023/0191708 A1   Jun. 22, 2023

(51) Int. Cl.
*B29C 65/02* (2006.01)
*B29C 65/00* (2006.01)

(52) U.S. Cl.
CPC ...... *B29C 65/022* (2013.01); *B29C 66/53461* (2013.01); *B29C 66/721* (2013.01)

(58) Field of Classification Search
CPC ... B29C 65/022; B29C 65/06; B29C 65/0618; B29C 65/069; B29C 66/5346; B29C 66/721
USPC ...................... 156/73.1, 73.5, 73.6
See application file for complete search history.

(56) References Cited

U.S. PATENT DOCUMENTS

| | | | |
|---|---|---|---|
| 4,352,711 A * | 10/1982 | Toth ............... | B29C 65/7841 264/68 |
| 4,601,927 A | 7/1986 | Durfee | |
| 8,066,835 B2 | 11/2011 | Vetter et al. | |
| 9,422,024 B2 | 8/2016 | Al-Sheyyab et al. | |
| 2007/0032972 A1 | 2/2007 | Glover et al. | |
| 2009/0104399 A1 * | 4/2009 | Field .............. | B29C 66/112 156/349 |
| 2014/0191492 A1 * | 7/2014 | Al-Sheyyab ...... | B62K 19/18 280/288.3 |
| 2022/0250572 A1 * | 8/2022 | Oh ................. | B60R 21/21 |

FOREIGN PATENT DOCUMENTS

| DE | 102018102784 | 8/2019 |
|---|---|---|
| JP | 2017100408 | 6/2017 |

OTHER PUBLICATIONS

European Patent Office, European Search Report dated Jun. 14, 2023 in Application No. 22212647.6.

* cited by examiner

*Primary Examiner* — George R Koch
(74) *Attorney, Agent, or Firm* — Snell & Wilmer L.L.P.

(57) ABSTRACT

A method for forming a fiber-reinforced thermoplastic hollow structure may comprise: abutting a first surface of a first flange of a shell and a second surface of a second flange of the shell with a mating component; disposing an end block laterally adjacent to the shell; applying a first load to a sidewall of the shell; applying a second load to the second flange of the shell; and vibrating one of the shell or the mating component while keeping a non-vibrating component stationary, the non-vibrating component including one of the shell or the mating component.

15 Claims, 5 Drawing Sheets

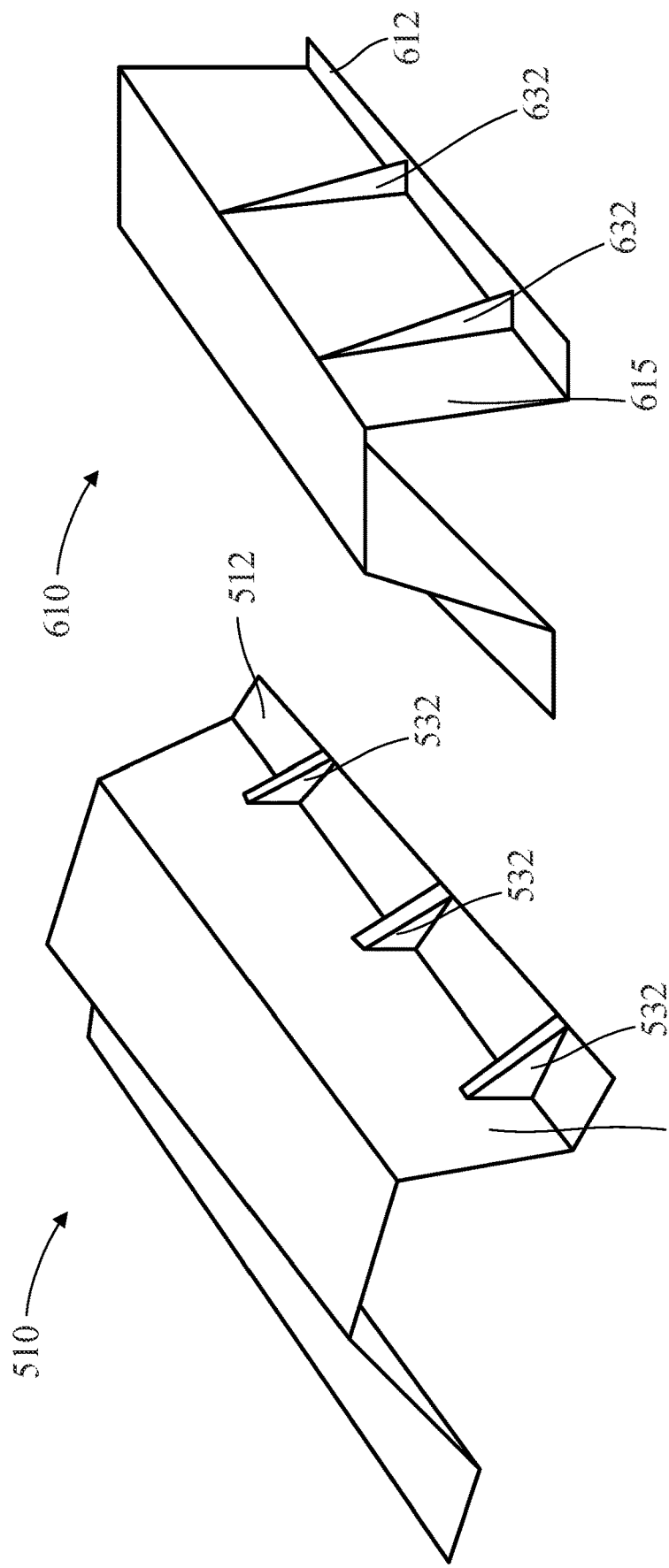

VIBRATION WELDING SYSTEMS AND METHODS

FIELD

The present disclosure relates generally to systems and methods for vibration welding hollow structures, and more specifically to systems and methods for vibration welding without a direct load applied to an outer weld area for aircraft components.

BACKGROUND

Aircraft are typically equipped with interior components and flight control surfaces. Flight control surfaces are utilized to maneuver the aircraft during flight as well as provide high lift surfaces to increase lift at low airspeed. Interior components vary significantly but often utilize hollow structures to reduce weight and decrease manufacturing costs. Vibration welding is utilized to couple a hollow structure to an adjacent component. Vibration welding operates at lower frequencies and higher amplitudes relative to ultrasonic welding. Additionally, a large clamping force is typically applied to each flange of a hollow structure that is being welded to an adjacent component.

SUMMARY

A method for forming a fiber-reinforced thermoplastic hollow structure is disclosed herein. The method may comprise: abutting a first surface of a first flange of a shell and a second surface of a second flange of the shell with a mating component; disposing an end block laterally adjacent to the shell; applying a first load to a sidewall of the shell; applying a second load to the second flange of the shell; and vibrating one of the shell or the mating component while keeping a non-vibrating component stationary, the non-vibrating component including one of the shell or the mating component.

In various embodiments, the vibrating generates heat between the first surface of the first flange and the mating component and generates heat between the second surface of the second flange and the mating component.

In various embodiments, a direct load is not applied to the first flange.

In various embodiments, the vibrating forms a weld seam between the first flange and the mating component. The weld seam may be between 20% and 80% of a lateral length of the first flange.

In various embodiments, the shell comprises a fiber-reinforced thermoplastic material including continuous fibers.

In various embodiments, the method further comprises stamp forming a plurality of ridges into the first flange prior to the abutting.

In various embodiments, the method further comprises one of over molding or insert molding stiffening members between the first flange and an adjacent sidewall of the first flange prior to the abutting.

In various embodiments, the method further comprises stamp forming stiffening ribs into an adjacent sidewall of the first flange prior to the abutting.

A method for forming a fiber-reinforced thermoplastic hollow structure is disclosed herein. The method may comprise: abutting a first surface of a first flange of a shell and a second surface of a second flange of the shell with a mating component; applying a first load to a sidewall of the shell and a second load to the second flange without applying a load to the first flange; restraining lateral movement of the first flange; and vibrating one of the mating component or the shell in a longitudinal direction to join at least a portion of the first flange to the mating component.

In various embodiments, the vibrating includes oscillating a vibrating component that comprises one of the mating component or the shell relative to a non-vibrating component that comprises one of the mating component or the shell.

In various embodiments, the method further comprises disposing an end block laterally adjacent to the shell.

In various embodiments, the shell comprises at least one of glass fibers, carbon fibers, aramid fibers, basalt fibers, mineral fibers, fibers from renewable raw materials, metal fibers and polymer fibers.

In various embodiments, the shell comprises a thermoplastic material comprising at least one of polyimide (PA), polypropylene (PP), polyethylene (PE), polyoxymethylene (POM), polyphenylene sulphide (PPS), polyether ether ketone (PEEK), polyetherimide (PEI), polyethylene terephthalate (PET), polyphthalamide (PPA), Poly ether ketone ketone (PEKK), Poly aryl ether ketone (PAEK).

A fiber-reinforced thermoplastic hollow structure is disclosed herein. The fiber-reinforced thermoplastic hollow structure may comprise: a shell comprising a first flange, a second flange, and sidewalls, the shell comprising a fiber-reinforced thermoplastic material; and a mating component coupled to the first flange and the second flange and including a first internal surface, and the first internal surface and internal surfaces of the sidewalls defining a cavity, the first flange and the mating component defining a first weld seam, the first weld seam being between 20% and 80% of a lateral length of the first flange.

In various embodiments, the first weld seam is between 20% and 60% of the lateral length of the first flange.

In various embodiments, the second flange and the mating component define a second weld seam, the second weld seam being between 90% and 100% of a second lateral length of the second flange.

In various embodiments, at least one of the first flange and the second flange further comprises a plurality of stiffening ridges.

In various embodiments, the fiber-reinforced thermoplastic hollow structure further comprises stiffening ribs disposed at least one of between the first flange and an adjacent sidewall and between the second flange and an adjacent sidewall in the sidewalls of the shell.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5 illustrates a perspective view of a shell, in accordance with various embodiments; and FIG. 6 illustrates a perspective view of a shell, in accordance with various embodiments.

DETAILED DESCRIPTION

Figure 1C:
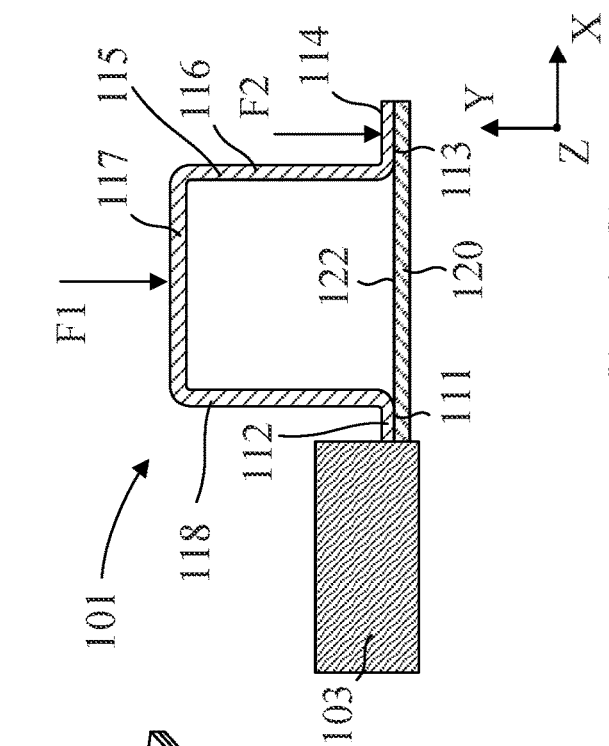
FIG. 1C illustrates a cross-sectional view of a shell and a mating component during vibration welding, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In general, the example shells and mating components used to form a hollow structure as described herein may be used with control surfaces, such as aircraft wings, stabilizers, or elevators, among other aerodynamic surfaces of an aircraft. Some examples of common names for these surfaces known to those practiced in the arts include but are not limited to flaps, ailerons, rudders, elevators, stabilators, elevons, spoilers, lift dumpers, speed brakes, airbrakes, trim tabs, slats, flaperons, spoilerons, and canards. These are henceforth referred to as control surfaces. In general, control surfaces may direct air flow during maneuvering and in-flight aircraft attitude adjustments. The example control surfaces described herein may provide increased resistance to impact damage than some known control surface constructions. Further, the example methods for manufacturing control surfaces described herein include fewer and lighter components than some known control surfaces. Thus, the example control surfaces described herein provide increased fuel efficiency and/or range to aircraft. Still further, the example control surfaces may be manufactured using an automated skin/stiffener manufacturing process, as described herein, which optimizes material usage and reduces cycle time.

Although described with respect to control surfaces, the present disclosure is not limited in this regard. For example, shells and mating components coupled together in accordance with the systems and methods disclosed herein may be used for aircraft interior components like seat backs, urban aerial mobility (UAM) components, or the like.

A thermoplastic material including a fiber-reinforced structure, as described herein, includes a structural body comprising skin members. In various embodiments, the skin members include a continuous fiber reinforced fabric, or unidirectional tape based laminate, and a thermoplastic resin. The reinforcing fiber, or a combination of reinforcing fibers, to be used for the fiber-reinforced structure has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for a mating component and/or a shell may be either semi-crystalline or amorphous.

Examples of the semi-crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI, polyetherimide (PEI), polysulfone (PSU), polyether sulfone (PES), and polyarylate (PAR). The thermoplastic resin to be used for the control surface also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

Disclosed herein is a method of vibration welding without applying a direct load to a flange that is welded to a mating component. The flange is an element of a shell being coupled to the mating component via vibration welding. The flange is compressed, via the method disclosed herein, from a nearby area, which generates a force on a weld area of the flange and the mating component sufficient to weld the flange to the mating component. In this regard, tooling costs may be reduced, a vibration welding process may be simplified, and/or a high weld strength between the flange and the mating component may be maintained.

Figure 1B:
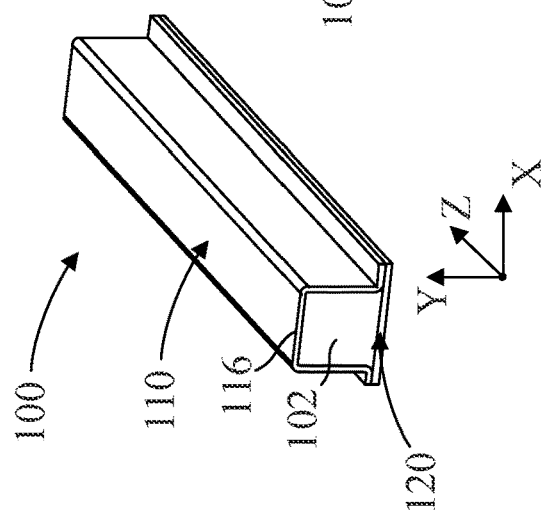
FIG. 1B illustrates a perspective view of a shell and a mating component coupled together to form a hollow structure via vibration welding, in accordance with various embodiments.
Figure 1A:
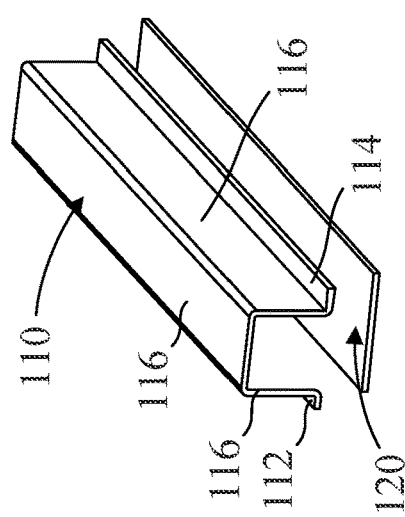
FIG. 1A illustrates a perspective view of a shell and a mating component prior to vibration welding, in accordance with various embodiments.

Referring now to FIG. 1A, a perspective view of a shell 110 and a mating component 120 prior to vibration welding is illustrated in accordance with various embodiments. In various embodiments, the shell 110 and the mating component 120 both comprise a fiber reinforced thermoplastic material. The shell 110 may be formed from a first continuous fiber reinforced fabric or uni-directional tape based laminate, as described herein. The mating component 120 may be formed from a second continuous fiber reinforced fabric, as described herein. In various embodiments, the second continuous fiber reinforced fabric is the same or similar material as the first continuous fiber reinforced fabric. In various embodiments, the shell 110 and/or the mating component 120 may both be formed of multiple layers of fiber reinforced fabric. The present disclosure is not limited in this regard. In various embodiments, one of the shell 110 and the mating component 120 may comprise a fiber-reinforced thermoplastic material and the remaining component may comprise any other material, such as a metal alloy (e.g., nickel-based alloy, titanium-based alloy, aluminum-based alloy, iron-based alloy, etc.). The present disclosure is not limited in this regard.

In various embodiments, the shell 110 and the mating component 120 may be formed by combining fiber fillers and thermoplastic resin at a pre-selected ratio to form a thermoplastic composite material with continuous fiber reinforcement. For example, the shell 110 and/or mating component 120 may be formed using automated fiber placement or automated tape laying. The pre-selected ratio may have any percentage or ratio of fiber filler to resin, such as 60% fiber filler and 40% resin. The mixture may range from 0% fiber filler and 100% resin to 80% fiber filler and 20% resin. In this regard, shell 110 and/or the mating component 120 may be continuous fiber reinforced. However, it is contemplated herein that shell 110 and the mating component 120 may be discontinuous fiber reinforced, in accordance with various embodiments.

In various embodiments, the shell 110 comprises a first flange 112 and a second flange 114. The first flange 112 and the second flange 114 are configured to be vibration welded to the mating component 120 without a direct load being applied to the first flange 112 as described further herein.

In various embodiments, the shell 110 further comprises sidewalls 116. With reference now to FIG. 1B, internal surfaces of the sidewalls 116 and an internal surface of the mating component 120 define a cavity 102 of a hollow structure 100 in response to being coupled together via the systems and methods disclosed herein. Although illustrated as comprising perpendicular sidewalls to form a substantially square cross-section for the cavity 102, the present disclosure is not limited in this regard. For example, sidewalls 116 may comprise acute or obtuse angles and/or may define various types of cross-sections, such as trapezoidal, polygonal, hexagonal, or the like and still be within the scope of this disclosure. In various embodiments, each flange (e.g., first flange 112 and second flange 114) extends laterally (i.e., in the X-direction) from an adjacent sidewall (e.g., sidewall 118 for first flange 112 and sidewall 116 for flange 114). In various embodiments, a centerline through the cavity 102 (i.e., in the Z direction) may define a longitudinal axis for the hollow structure 100 from FIG. 1B.

Figure 2:
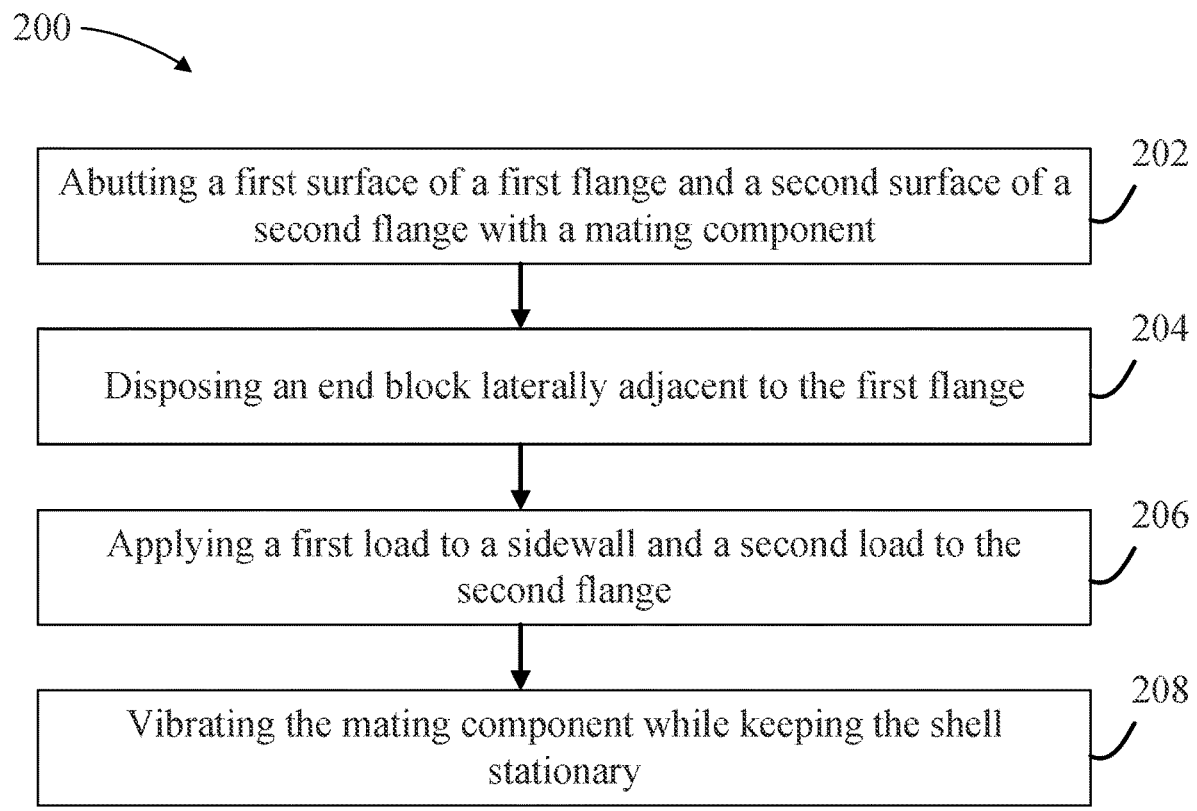
FIG. 2 illustrates a method of vibration welding, in accordance with various embodiments.
Figure 3:
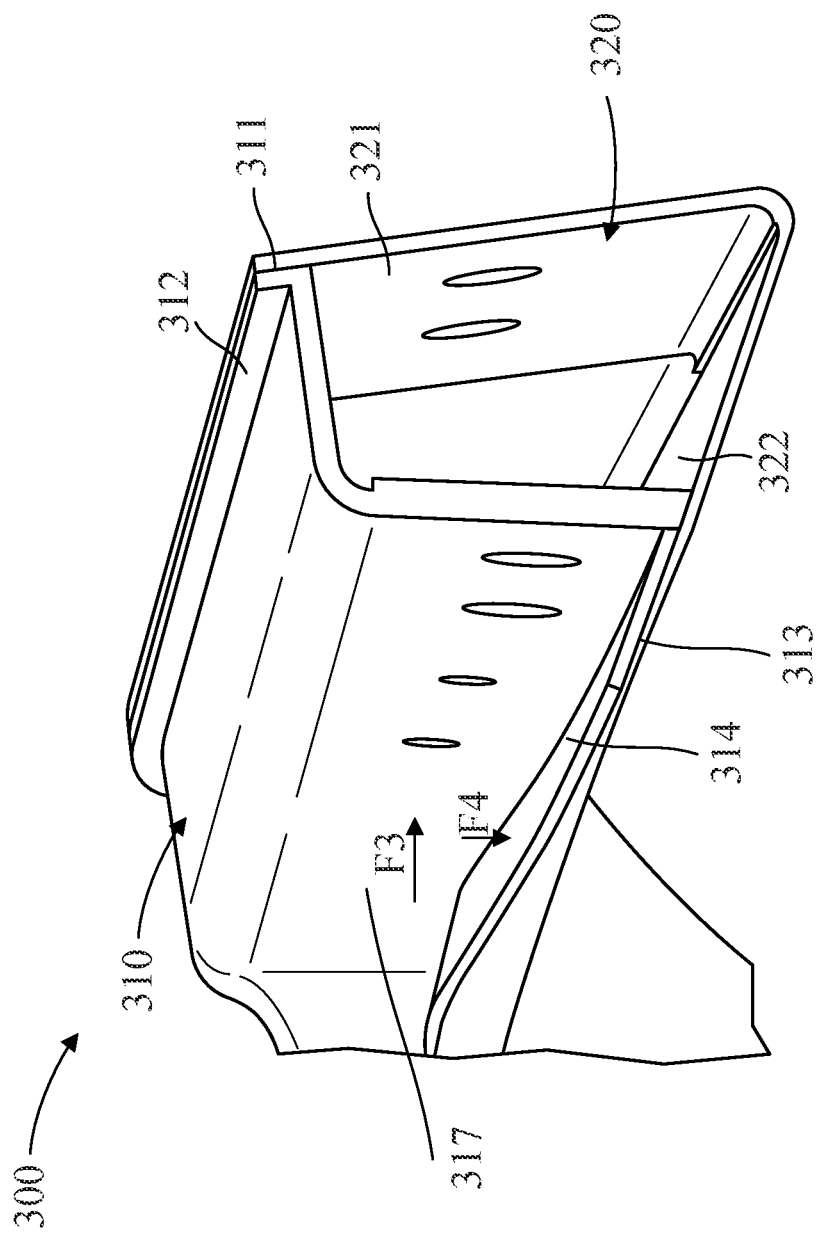
FIG. 3 illustrates a perspective view of a shell and a mating component coupled together, in accordance with various embodiments.

Referring now to FIG. 1C, a system 101 for coupling the shell 110 to the mating component 120 via vibration welding is illustrated, in accordance with various embodiments. With combined reference to FIGS. 1C and 2, a method 200 of coupling the shell 110 to the mating component 120 comprises abutting a first surface 111 of the first flange 112 and a second surface 113 of the second flange 114 with the mating component 120 (step 202). In various embodiments, the first surface 111 and the second surface 113 may abut a single surface (e.g., a singular planar surface 122) of the mating component 120; however, the present disclosure is not limited in this regard. For example, with brief reference to FIG. 3, a first surface 311 of a first flange 312 of a shell 310 may abut a first surface 321 of a mating component 320 and a second surface 313 of a second flange 314 of the shell 310 may abut a second surface 322 of the mating component (i.e., where the second surface 322 is in a different plane from the first surface 321) and still be within the scope of this disclosure.

The method 200 further comprises disposing an end block 103 laterally adjacent to the first flange 112 (i.e., the flange where a load will not be applied) of the shell 110 (step 204). Although illustrated as being disposed adjacent to the first flange 112, the present disclosure is not limited in this regard. For example, the first flange 112 could be oriented inward (i.e., into the cavity 102 from FIG. 1B) and still be within the scope of this disclosure. In this regard, the end block 103 would be disposed laterally adjacent to a sidewall 118 of the sidewalls 116. The end block 103 is configured to restrain lateral movement (i.e., movement in the −X direction) during vibration welding as described further herein. In this regard, a lateral position of a weld line may remain constant during the welding process, in accordance with various embodiments.

The method 200 further comprises applying a first load F1 to a sidewall 117 of the sidewalls 116 and a second load F2 to the second flange 114 (step 206). Each of the loads F1 and F2 may be at least generally directed toward the mating component 120. In various embodiments, the first load F1 applied to the sidewall 117 may be substantially perpendicular to a plane defined by the sidewall 117. In various embodiments, in response to the plane defined by the sidewall 117 being contoured, a plurality of local forces may be applied which may be substantially perpendicular to the sidewall 117 at a local point where the force is applied. "Substantially perpendicular" as defined herein is between 60° and 90°, or between 70° and 90°, or between 80° and 90°. In various embodiments, a contact surface of the sidewall 117 configured to receive the first load F1 may be substantially co-planar with the first surface 111 of the first flange 112. "Substantially co-planar" as referred to herein is between 0° and 30°, or between 0° and 20°, or between 0° and 10°, in accordance with various embodiments.

Although illustrated as applying the first load F1 and the second load F2 in a similar direction, the present disclosure is not limited in this regard. For example, with brief reference to FIG. 3, a load F3 may be applied substantially perpendicular to sidewall 317 and a load F4 may be applied substantially perpendicular to the second flange 314 during the method 200 for forming the hollow structure 300. In this regard, the load applied to the sidewall (e.g., a non-mating flange), may be substantially perpendicular to a mating surface of a non-loaded wall (e.g., first surface 311 of first flange 312. In this regard, the load F3 supplied to sidewall 317 supplies a sufficient force, combined with an end block 103 from FIG. 1C positioned against the side of flange 312 and component 320 preventing lateral motion of the first flange 312, to join the first flange 312 to the mating component 320 during step 208 as described further herein.

The method 200 further comprises vibrating the mating component 120 while keeping the shell 110 stationary (step 208). Although described as vibrating the mating component 120 relative to the shell 110, the present disclosure is not limited in this regard. For example, in various embodiments, the shell 110 may be vibrated while the mating component 120 is kept stationary. In various embodiments, "vibrating" as described herein refers to translating a component (e.g., the mating component 120 or the shell 110) relative to the other component back and forth (e.g., oscillating) in a longitudinal direction (i.e., alternating between the Z direction and the −Z direction in FIG. 1C) to generate friction heat between the first surface 111 of the first flange 112 and the mating component 120 and the second surface 113 of the second flange 114 and the mating component 120. In this regard, the friction heat fuses at least a portion of the first surface 111 of the first flange 112 and the second surface 113 of the second flange 114 to the mating component 120.

In various embodiments, a weld formed on the non-loaded flange (e.g., the first flange 112) may only be a partial lateral length (i.e., measured in the X direction from an adjacent sidewall) of the flange. For example, welding a shell 110 with a flange length of 0.25 inches (0.635 cm) may result in a weld seam of approximately 0.10 inches (0.254 cm). In various embodiments, a weld seam may be between 20% and 80% of a lateral length (i.e., in the X-direction) of a non-loaded flange, or between 20% and 60%, or between 25% and 50% by the method 200 disclosed herein. Although the entire flange of the non-loaded flange (e.g., first flange 112) may not weld to the mating component, the partial weld seam may be sufficient for loading of the hollow structure 100 from FIG. 1B. For example, in some real cases the torsional test data of a resultant hollow structures 100 formed via method 200 from FIG. 2 resulted in the hollow structure 100 buckling, and ultimately failing, prior to disbond of the weld seam formed from the method 200. In this regard, the decrease in weight and cost of manufacturing the hollow structure 100 outweigh any reduction in structural capabilities of the weld formed by the method 200 disclosed herein. In contrast to the non-loaded flange, the weld formed on the loaded flange (e.g., the second flange 114) may be between 90% and 100% of a lateral length of the flange, between 95% and 100% of a lateral length of the flange, or approximately an entire lateral length of the flange, in accordance with various embodiments.

In various embodiments, by not having to apply a direct load to a flange (e.g., first flange 112) that is being friction welded to a mating component 120, more complex hollow structures (e.g., hollow structure 300 from FIG. 3) may be manufactured in a simpler manner and/or at a lower expense relative to typical vibration welding processes.

Figure 4:
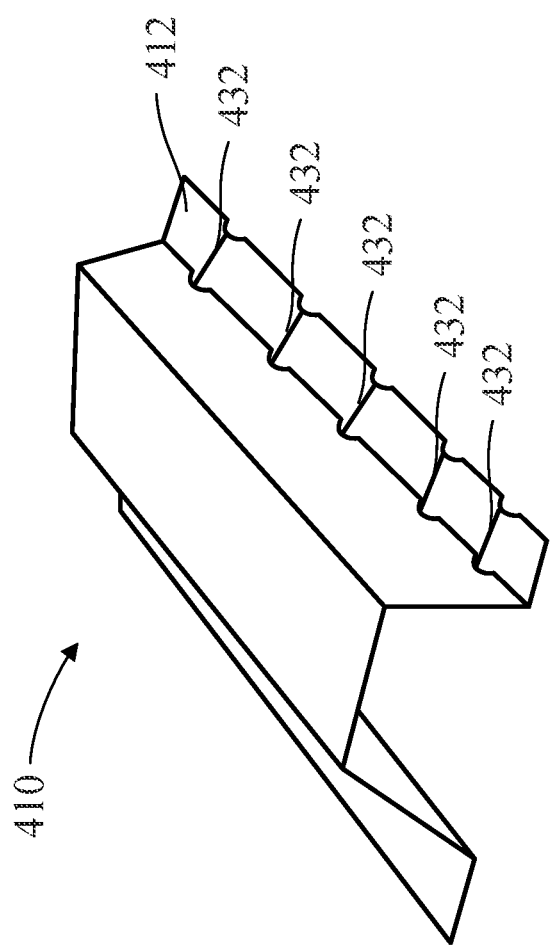
FIG. 4 illustrates a perspective view of a shell, in accordance with various embodiments.

In various embodiments, to further facilitate thinner shells being coupled to mating components, a stiffening structure may be coupled to the first flange 112 and an adjacent sidewall 118 and/or a stiffening structure may be coupled to the flange 114 and an adjacent sidewall of the sidewalls 116. For example, with reference now to FIG. 4, a plurality of stiffening ridges 432 may be stamp formed into a first flange 412 of a shell 410 prior to performing the vibration welding method 200 from FIG. 2. With reference now to FIGS. 5 and 6, stiffening ribs 532 may be over molded or in-molded between a first flange 512 and an adjacent sidewall 515 of a shell 510 (FIG. 5) or stiffening ribs 632 may be stamp formed into an adjacent sidewall 615 of a first flange 612 of a shell 610 (FIG. 6) to further facilitate thinner shells being coupled to mating components as described herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a fiber-reinforced thermoplastic hollow structure, comprising:
   abutting a first surface of a first flange of a shell and a second surface of a second flange of the shell with a mating component, the shell comprising the first flange, the second flange, and at least two sidewalls extending from the first flange to the second flange;
   disposing an end block laterally adjacent to the first flange of the shell;

applying a first load to a sidewall in the at least two sidewalls of the shell, wherein a second sidewall in the at least two sidewalls remains un-loaded directly;

applying a second load to the second flange of the shell; and vibrating one of the shell or the mating component while keeping a non-vibrating component stationary, the non-vibrating component including one of the shell or the mating component, wherein the first flange is coupled to the mating component in response to the vibrating.

2. The method of claim 1, wherein the vibrating generates heat between the first surface of the first flange and the mating component and generates heat between the second surface of the second flange and the mating component.

3. The method of claim 1, wherein the vibrating forms a weld seam between the first flange and the mating component.

4. The method of claim 3, wherein the weld seam is between 20% and 80% of a lateral length of the first flange.

5. The method of claim 1, wherein the shell comprises a fiber-reinforced thermoplastic material including continuous fibers.

6. The method of claim 1, further comprising stamp forming a plurality of ridges into the first flange prior to the abutting.

7. The method of claim 1, further comprising one of over molding or insert molding stiffening members between the first flange and an adjacent sidewall of the first flange prior to the abutting.

8. The method of claim 1, further comprising stamp forming stiffening ribs into an adjacent sidewall of the first flange prior to the abutting.

9. The method of claim 1, wherein a direct load is not applied to the first flange.

10. A method for forming a fiber-reinforced thermoplastic hollow structure, comprising:

abutting a first surface of a first flange of a shell and a second surface of a second flange of the shell with a mating component, the shell comprising the first flange, the second flange, and at least two sidewalls extending from the first flange to the second flange;

applying a first load to a sidewall in the at least two sidewalls of the shell and a second load to the second flange without applying a third load to the first flange and without applying a fourth load to a second sidewall in the at least two sidewalls;

restraining lateral movement of the first flange; and vibrating one of the mating component or the shell in a longitudinal direction to join at least a portion of the first flange to the mating component.

11. The method of claim 10, wherein the vibrating includes oscillating a vibrating component that comprises one of the mating component or the shell relative to a non-vibrating component that comprises one of the mating component or the shell.

12. The method of claim 10, further comprising disposing an end block laterally adjacent to the shell.

13. The method of claim 10, wherein the vibrating generates heat between the first surface of the first flange and the mating component and generates heat between the second surface of the second flange and the mating component.

14. The method of claim 10, wherein the shell comprises at least one of glass fibers, carbon fibers, aramid fibers, basalt fibers, mineral fibers, fibers from renewable raw materials, metal fibers and polymer fibers.

15. The method of claim 10, wherein the shell comprises a thermoplastic material comprising at least one of polyimide (PA), polyamide-imide (PAI), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), Poly ether ketone ketone (PEKK), Poly aryl ether ketone (PAEK).

* * * * *